(12) United States Patent
Cusack (10) Patent No.: US 8,056,987 B2
(45) Date of Patent: Nov. 15, 2011

(54) BICYCLE WHEEL QUICK RELEASE ASSEMBLY

(75) Inventor: Douglas A. Cusack, Cottage Grove, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 0 days.

(21) Appl. No.: 12/756,531

(22) Filed: Apr. 8, 2010

(65) Prior Publication Data
US 2010/0194184 A1 Aug. 5, 2010

Related U.S. Application Data

(62) Division of application No. 12/103,744, filed on Apr. 16, 2008, now Pat. No. 7,722,129.

(51) Int. Cl.
*B60B 35/00* (2006.01)
(52) U.S. Cl. .................... 301/124.2; 301/110.5
(58) Field of Classification Search ........... 301/110.5, 301/124.2, 132; 280/279, 288; 403/109.5, 403/374.1, 374.2, 374.4, 374.5, DIG. 8
See application file for complete search history.

(56) References Cited

U.S. PATENT DOCUMENTS

| | | |
|---|---|---|
| 331,805 A | 12/1885 | McCalop |
| 2,630,020 A | 3/1953 | Juy |
| 3,610,659 A | 10/1971 | Gerarde |
| 4,033,627 A | 7/1977 | Morroni |
| 4,079,958 A | 3/1978 | Segawa |
| 4,114,409 A | 9/1978 | Scire |
| 4,400,038 A | 8/1983 | Hosokawa |
| 4,724,692 A | 2/1988 | Turin et al. |
| 4,763,957 A | 8/1988 | Poehlmann et al. |
| 4,789,206 A | 12/1988 | Ozaki |
| 4,805,941 A | 2/1989 | Downing et al. |
| 4,906,053 A | 3/1990 | Kawai |
| 4,964,287 A | 10/1990 | Gaul |
| 5,005,390 A | 4/1991 | Giannini et al. |
| 5,118,125 A | 6/1992 | Plunkett |
| 5,121,973 A | 6/1992 | Phillips |
| 5,165,762 A | 11/1992 | Phillips |
| 5,238,259 A | 8/1993 | Wilson et al. |
| 5,337,587 A | 8/1994 | Davidson |
| 5,364,115 A | 11/1994 | Klein et al. |
| 5,383,716 A | 1/1995 | Stewart et al. |
| 5,516,131 A | 5/1996 | Novotny |
| 5,567,020 A | 10/1996 | Phillips et al. |
| 5,576,020 A | 11/1996 | Iritani et al. |
| 5,653,511 A | 8/1997 | Herkoperec et al. |

(Continued)

FOREIGN PATENT DOCUMENTS

FR 983137 6/1951

(Continued)

*Primary Examiner* — Kip T Kotter
(74) *Attorney, Agent, or Firm* — Boyle Fredrickson, S.C.

(57) ABSTRACT

A quick release assembly for a bicycle wheel that includes a pair of heads disposed at generally opposite ends of a skewer rod. One of the heads includes a cam surface that is translatable relative to the head. The quick release includes an operator having a handle portion and a stem portion. The stem portion includes a cam that cooperates with the cam surface formed in one of the heads such that operation of the handle alters the distance between the heads from a first orientation wherein the heads secure a wheel to a bicycle, a second orientation wherein the heads loosely secure the wheel to the bicycle and a third orientation wherein the wheel assembly can be freely removed from the bicycle.

19 Claims, 7 Drawing Sheets

U.S. PATENT DOCUMENTS

| | | | |
|---|---|---|---|
| 5,653,512 A | 8/1997 | Phillips | |
| 5,673,925 A | 10/1997 | Stewart | |
| 5,961,186 A | 10/1999 | Phillips | |
| 6,089,675 A | 7/2000 | Schlanger | |
| 6,241,322 B1 | 6/2001 | Phillips | |
| 6,260,931 B1 | 7/2001 | Stewart | |
| 6,296,322 B1 | 10/2001 | Marzocchi et al. | |
| 6,386,643 B1 | 5/2002 | Marzocchi et al. | |
| 6,454,363 B1 | 9/2002 | Vignocchi et al. | |
| 6,742,849 B1 | 6/2004 | Denby | |
| 6,761,417 B2 * | 7/2004 | Denby | 301/124.2 |
| 7,000,995 B2 | 2/2006 | Hagelthorn | |
| 7,530,645 B2 * | 5/2009 | Takachi | 301/124.2 |
| 7,562,943 B2 * | 7/2009 | Kanehisa | 301/124.2 |
| 7,665,928 B2 * | 2/2010 | Winefordner et al. | 403/322.4 |
| 2002/0026816 A1 | 3/2002 | Katsouros et al. | |
| 2004/0046353 A1 * | 3/2004 | Neugent | 280/274 |
| 2007/0052285 A1 | 3/2007 | Montague et al. | |
| 2007/0052286 A1 | 3/2007 | Montague et al. | |
| 2007/0145814 A1 | 6/2007 | D'Aluisio | |
| 2009/0121538 A1 * | 5/2009 | Chang | 301/124.2 |

FOREIGN PATENT DOCUMENTS

| | | |
|---|---|---|
| FR | 995747 | 12/1951 |
| GB | 658726 | 10/1951 |
| IT | 463954 | 2/1951 |

* cited by examiner

BICYCLE WHEEL QUICK RELEASE ASSEMBLY

CROSS-REFERENCE TO RELATED APPLICATIONS

This patent application is a divisional application that claims priority to allowed U.S. patent application Ser. No. 12/103,744 filed on Apr. 16, 2008 now U.S. Pat. No. 7,722, 129 titled "Bicycle Wheel Quick Release Assembly", the disclosure of which is expressly incorporated herein.

BACKGROUND OF THE INVENTION

The present invention relates generally to bicycles and, more particularly, to a quick release assembly for securing a wheel to a bicycle such that the wheel can be removed and connected to a bicycle without the use of tools or the like.

Traditionally, the wheels of a bicycle are secured to the frame via an axle or skewer rod that passes through a hub of the wheel and cooperates with corresponding structure of the frame. Occasionally, the wheel assemblies require servicing such as the changing of a tire or the like. It is readily appreciated that replacing a bicycle tire requires disengaging at least one side of the wheel assembly from the adjacent frame of the bicycle. Commonly, do in part to the awkwardness of manipulating a bicycle by a wheel, it is often more convenient to remove the wheel assembly entirely from the bicycle to perform such servicing. It is also readily appreciated that such service or repair activities are often presented at the most inopportune times and places. That is, when ride performance is being monitored or inclement weather arises, the need for quick wheel repair can affect performance and/or ride enjoyment.

Others, having recognized the desire to quickly and efficiently remove, repair, and reinstall a bicycle wheel, have provided a litany of wheel retention systems intended to simplify the process of removing and reinstalling a bicycle wheel. An early solution to this problem was the introduction of slotted fork dropouts. The slotted dropouts cooperate with an axle or skewer rod of the wheel assembly such that, with slight loosening of a retention system, the wheel assembly could be removed from the bicycle without fully separating the respective components of the wheel assembly. Although such systems enhanced the ease with which the wheel assembly could be removed from the bicycle, such systems also commonly required access to various tools to effectuate operation of the retention system.

To overcome the necessity of always having tools at the ready for operating the release system, others have provided tool-less retention systems. Such systems commonly include a lever that extends from a head member of the release system and which is operable to loosen the retention system. However, it was recognized that improper installation or closure of the lever of such release systems could result in the unintentional loosening of the retention mechanism due to road vibration and/or inadvertent contact with the non-fully closed lever could result in undesired separation of the wheel assembly from the bicycle. Understandably, such an event would be particularly problematic during use of the bicycle.

To ensure that a wheel assembly could not be removed from a bicycle without user interaction with the retention system, many prior art devices include a redundant retention system. The redundant retention system maintains some form of interaction of the wheel assembly and the bicycle independent of the position of the primary retention means. That is, even though the individual components of the primary retention system are in a position wherein the wheel assembly should otherwise disengage from the bicycle frame, the redundant retention system requires separate operation. Typically, such bicycle wheel quick release systems require concurrent manipulation and orientation of a number of individual parts of the release mechanism, the wheel assembly, and the redundant retention mechanism to effectuate removal of the wheel assembly from the bicycle. Accordingly, such quick release systems commonly require two hands to facilitate removing and reinstalling the wheel assembly.

Commonly, the rider must concurrently interact with both the left-hand and the right-hand sides of the wheel assembly. The concurrent inaction of the user with both sides of the wheel assembly generally demands that the user must be radially aligned with the wheel assembly such that an arm generally flanks each side of the wheel assembly. Such a requirement substantially limits the orientations that are available for the rider to effectuate a wheel servicing procedure. Such a requirement can also test the dexterity and flexibility of many riders.

Therefore, there is a need for a bicycle wheel quick release assembly that includes a redundant retention feature and which can be operated by a single hand of an operator to effectuate removal of the wheel assembly.

BRIEF DESCRIPTION OF THE INVENTION

The present invention provides a bicycle wheel quick release assembly that overcomes one or more of the aforementioned drawbacks. One aspect of the invention is directed to a wheel quick release assembly that includes a first head portion and a second head portion secured to generally opposite ends of a skewer. A cam surface is formed in the first head portion. A cam profile is formed on a portion of a shaft that extends from a handle. The cam profile of the shaft is aligned with the cam surface formed in the first head. The cam profile is configured to cooperate with the cam surface such that the shaft is rotatable between a first position and a second position. When located in the first position, the first and second head portions are spaced to secure the skewer to a bicycle. When the handle is located in the second position, the first and second head portions are spaced such that the skewer can pass freely, or uninterruptably, from the bicycle.

Another aspect of the present invention includes a bicycle wheel retention system having a rod constructed to pass through a hub of a bicycle wheel. A first head and a second head are attached to first and second ends of the rod, respectively. The system includes a stem configured to be received in a recess that is formed in the first head. The stem has a shape that cooperates with the recess such that rotation of the stem about an axis that is generally normal to a longitudinal axis of the rod alters a distance between the first head and the second head. The stem and recess cooperate so as to provide a tactile indication of an orientation of the first and second heads relative to one another.

A further aspect of the invention that is related to the above aspects includes a method for providing a quick release connection between a bicycle wheel and a bicycle frame. The method includes providing a skewer rod having a pair of head portions constructed to cooperate with dropouts of a bicycle. One of the heads is provided with a release assembly having an operable handle that is rotatable between a first position, a second position, and a third position. When the handle is located in the first position, the head portions are positioned to secure the bicycle wheel to the bicycle frame. When the handle is located in the second position the head portions are loose but retained to the bicycle frame. When the handle is in the third position, the head portions can pass freely from the bicycle frame.

Yet another aspect of the present invention that can be combined with one or more of the above aspects is providing the cam surface in a body, or shuttle body, that is lateral translatable, or slidable, relative to the respective head portion.

Another aspect combinable with one or more of the above aspects includes a biasing means disposed between the shuttle body and the head. Preferably, the biasing means is a spring that biases the shuttle body in a direction which reduces the distance between the respective heads.

Another aspect useable with one or more of the above aspects is to form the cam profile as a tri-lobed cam. Another aspect is to offset the cam profile relative to an axis of rotation of the shaft.

Another aspect of the present invention that is combinable with one or more of the above aspects includes providing the second head as a first portion and a second portion that are independently adjustable relative to the skewer to define a distance between the first head portion and the second head portion when the handle is located in a position associated with the quick release being closed and locked. Another feature of this aspect of the invention includes a set screw that interacts with the first and second portion of the second head to define a position of the second head relative to the skewer rod.

It is appreciated that the aspects and features of the invention summarized above are not limited to any one particular embodiment of the invention. That is, many or all of the aspects above may be achieved with any particular embodiment of the invention. Those skilled in the art will appreciate that the invention may be embodied in a manner preferential to one aspect or group of aspects and advantages as taught herein. These and various other aspects, features, and advantages of the present invention will be made apparent from the following detailed description and the drawings.

BRIEF DESCRIPTION OF THE DRAWINGS

The drawings illustrate preferred embodiments presently contemplated for carrying out the invention.

DETAILED DESCRIPTION OF THE PREFERRED EMBODIMENT

Figure 1:
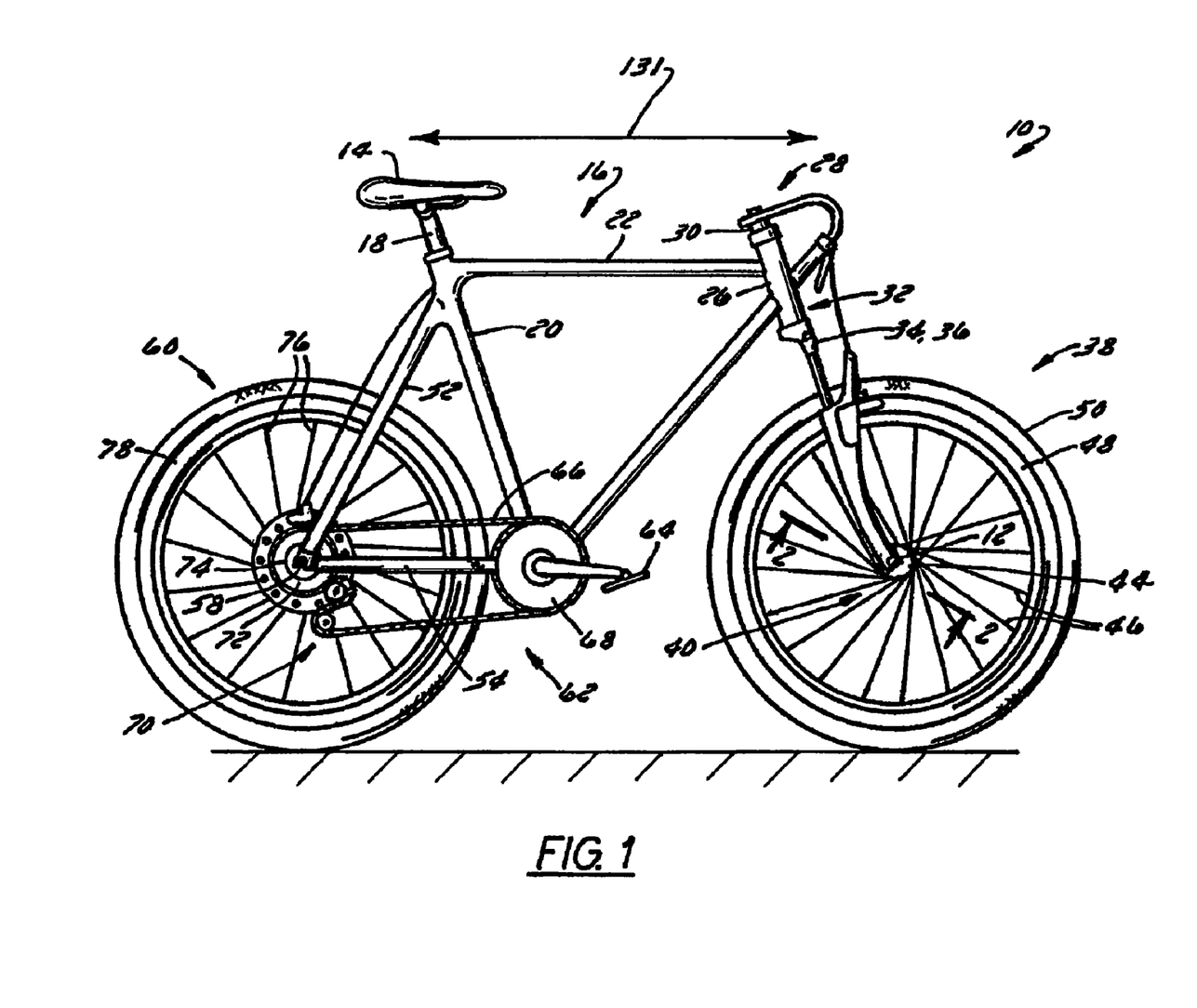
FIG. 1 is an elevational view of a bicycle equipped with a wheel quick release assembly according to the present invention.

FIG. 1 shows a bicycle 10 equipped with a wheel quick release assembly 12 according to the present invention. Bicycle 10 includes a seat 14 that is slidably attached to a frame 16. A seat post 18 is connected to seat 14 and slidably engages a seat tube 20 of frame 16. A top tube 22 and a down tube 24 extend forwardly from seat tube 20 to a head tube 26 of frame 16. A handlebar or handlebar assembly 28 is connected to a stem tube 30 that passes through head tube 26 and engages a fork crown 32. The position of handlebar assembly 28 is fixed relative to stem tube 30 and fork crown 32 such that handlebar assembly 28 and fork crown 32 rotate together relative to head tube 26.

A pair of forks 34, 36 extend from generally opposite ends of fork crown 32 and are constructed to support a front wheel assembly 38 at an end of each fork or fork tip 40. Fork tips 40 cooperate with generally opposite sides of quick release assembly 12 so as to secure a hub 44 of front wheel assembly 38 to bicycle 10. A number of spokes 46 extend between hub 44 and a rim 48 of front wheel assembly 38. A tire 50 is engaged with rim 48 such that rotation of tire 50, relative to forks 34, 36, rotates rim 48 and hub 44. Handlebar assembly 28 is connected to bicycle 10 such that side-to-side rotation of the handlebar assembly 28 rotates wheel assembly 38 relative to a longitudinal axis of bicycle 10 thereby steering bicycle 10.

Frame 16 includes a seat stay pair 52 and a chain stay pair 54 that offset an axis of rotation 58 of a rear wheel assembly 60 from a crankset 62. Crankset 62 includes a pair of pedals 64 that is operationally connected to a chain 66 via a chain ring or sprocket 68. Rotation of chain 66 communicates a drive force to a rear section 70 of bicycle 10. A gear cluster is positioned at rear section 70 and cooperates with chain 66. Gear cluster 72 is generally concentrically orientated with respect to axis 58 and includes a number of variable diameter gears.

Gear cluster 72 is operationally connected to a hub 74 of rear wheel assembly 60. A number of spokes 76 extend radially between hub 74 and a rim 78 of rear wheel assembly 60. As is commonly understood, rider operation of pedals 64 drives chain 66 thereby driving rear wheel assembly 60 which in turn propels bicycle 10. It is appreciated that the foregoing description of bicycle 10 is merely exemplary of a bicycle for use with the present invention. It is appreciated that bicycle 10 could be provided in any of a number of configurations including those configurations commonly referred to as street bikes, off-road or mountain bikes, hybrids of these types of bicycles, or other pedal driven vehicle configurations. It is further appreciated that, although the forthcoming description is directed to a quick release assembly associated with a front wheel assembly, bicycle 10 could include a second quick release assembly associated with rear wheel assembly 60.

Figure 2:
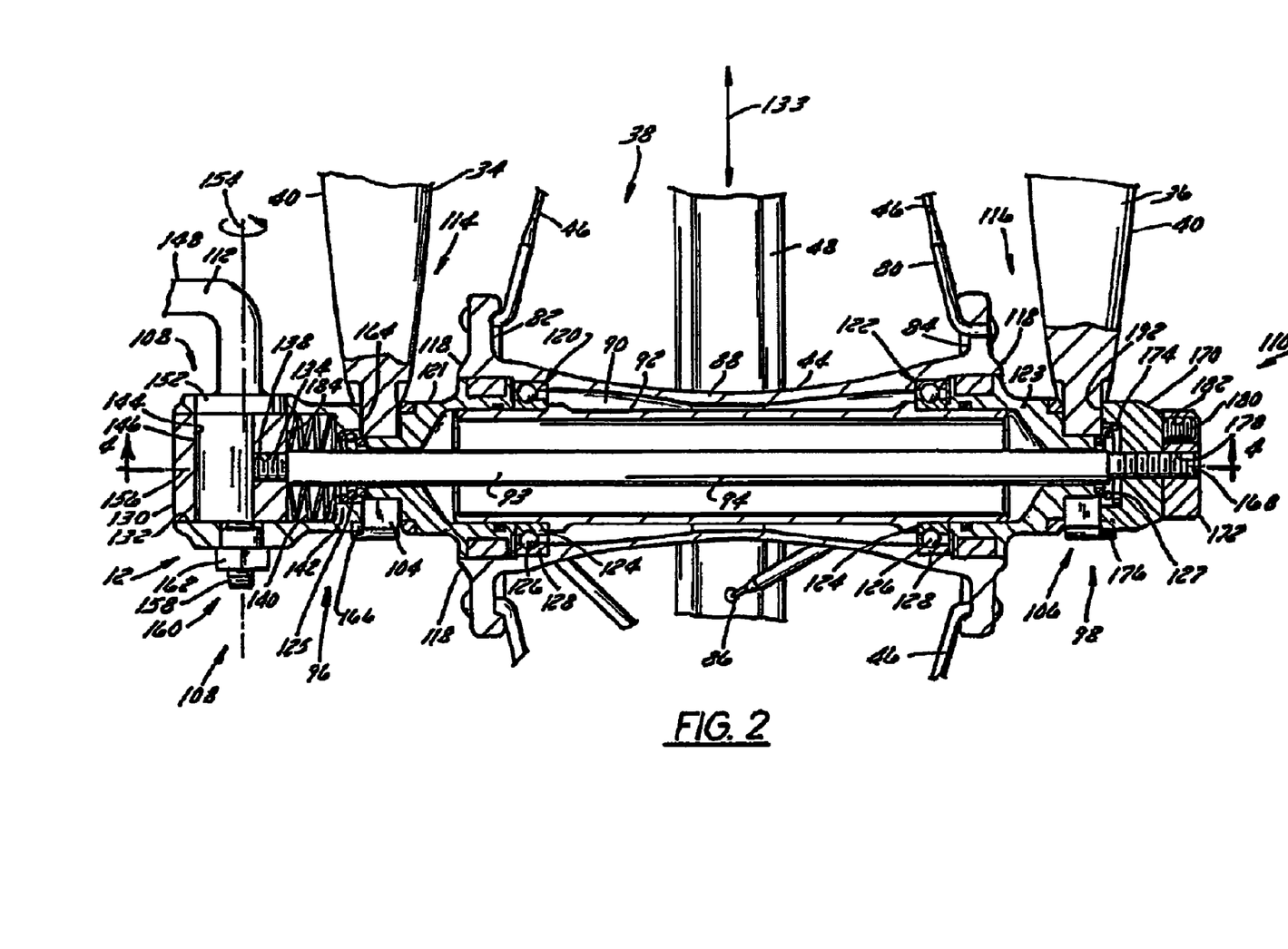
FIG. 2 is a cross-sectional view of a hub portion of the front wheel assembly of the bicycle shown in FIG. 1 and taken along line 2-2.

FIG. 2 is a cross-sectional view of front wheel assembly 38 taken along line 2-2 shown in FIG. 1. As shown in FIG. 2, each of spokes 46 includes a first end 80 that is secured to a respective flange 82, 84 of hub 44. A second end 86 of each spoke 46 is connected to rim 48. Flanges 82, 84 of hub 44 extend radially outward from a central portion 88 of hub 44. Central portion 88 of hub 44 is tube shaped and forms a passage 90 that is constructed to accommodate the passage of an axle 92 and a rod or skewer 93 through hub 44. Skewer 93 passes through a cavity 94 formed through axle 92 such that hub 44, axle 92, and skewer 93 are generally concentric with respect to one anther.

Opposite ends 96, 98 of skewer 93 pass beyond respective flanges 82, 84 of hub 44 and cooperate with fork tips 40 of forks 34, 36. Specifically, ends 96, 98 of skewer 93 cooperate with dropouts 104, 106 of forks 34, 36, respectively. A head assembly or first and second heads 108, 110 are engaged with respective ends 96, 98 of skewer 93. Heads 108, 110 cooperate with dropouts 104, 106 such that, as described further below, manipulation of a lever 112 by a user facilitates securing and removing wheel assembly 38 from bicycle 10.

Still referring to FIG. 2, axle 92 extends laterally across wheel assembly 38 from a first end 114 to a second end 116 of axle 92. Preferably, axle 92 does not extend beyond an outer surface 118 of each of the respective flanges 82, 84 of hub 44. Alternatively, axle 92 could be configured to extend beyond flanges 82, 84 and directly engage dropouts 104, 106.

A bearing 120, 122 and an end cap 121, 123 are positioned at each of ends 114, 116 of axle 92. Each bearing 120, 122 includes an inner race 124, a number of roller elements 126, and an outer race 128. Bearings 120, 122 are maintained in a generally radially concentric orientation with respect to hub 44, axle 92, and skewer 93. An optional spring 125, 127 is associated with each end 96, 98 of skewer 93 and generally center wheel assembly 38 relative to each head 108, 110 during removal and installation of wheel assembly 38. It is appreciated that the above description of wheel assembly 38 is merely exemplary of wheel assemblies usable with the present invention. It is envisioned that quick release assembly 12 is usable with other wheel assemblies, such as wheels having no end caps or end caps with other shapes and configurations disposed between the bearings and the dropouts. It is further understood that quick release assembly 12 is applicable to wheel assemblies where one or more of the axle and skewer interact with the dropouts or other bicycle frame features.

Referring to the left-hand side of quick release assembly 12 shown in FIG. 2, first head 108 of quick release assembly 12 includes a body or shuttle body 130 that is slidably received within a cavity 132 formed in first head 108. First end 96 of skewer 93 includes a threaded portion 134 that passes through an opening 136 formed in first head 108 and threadably engages an opening or bore 138 formed in shuttle body 130. Alternatively, shuttle body 130 and skewer 93 could be formed as one-piece such that skewer 93 would non-removably extend from shuttle body 130. A biasing means, such as a spring 140, extends about skewer 93 between shuttle body 130 and an inboard facing end or side 142 of first head 108. As used herein, the terms inboard and outboard refer to the location of structures with respect to a longitudinal axis of bicycle 10. Inboard features are features located nearer this axis whereas outboard structures are oriented in directions facing away from this axis.

A passage 144 is formed through shuttle body 130. Passage 144 is constructed to cooperate with a shaft or stem portion 146 of lever 112. A handle portion or handle 148 of lever 112 extends in a generally crossing direction relative to stem portion 146. A seat portion 150 is formed on lever 112 generally between stem portion 146 and handle portion 148. Seat portion 150 cooperates with an opening 152 formed in first head 108 such that lever 112 is generally rotatable relative to first head 108 about an axis 154 that passes though first head 108 and is generally perpendicular to a longitudinal axis 156 of skewer 93.

Stem portion 146 of lever 112 extends between seat portion 150 and a threaded portion 158 positioned proximate an end of lever 112. Threaded portion 158 is constructed to pass through a second opening 160 formed in first head 108. First and second openings 152, 160 are generally aligned with one another and provide mounting points for the rotation of lever 112 relative to first head 108. A fastener 162 cooperates with threaded portion 158 of lever 112 and opening 160 of first head 108 so as to maintain the desired axial orientation of lever 112 relative to first head 108 and with respect to axis 154.

It is appreciated that there are other alternatives for securing lever 112 to head 108. For example, lever 112 can be attached to head 108 via one or more relative geometries that axially associate lever 112 relative to head 108. Alternatively, fastener 162 may be formed as one of a rivet, a cotter pin, or a C-shaped type clip that cooperates with a corresponding structure, such as a hole, a passage, or a channel, which is formed in lever 112. Regardless of the modality of the connection, preferably, lever 112 is pivotally connected to first head 108 such that rotation of lever 112 yields lateral translation of skewer 93 relative to head 108.

First head 108 includes an inboard face 164 that cooperates with a projection 166 that extends from fork 34 proximate dropout 104. As described further below, the interaction of face 164 with projection 166 provides redundant retention of quick release assembly 12 relative to bicycle 10 until it is desired to remove wheel assembly 38 from bicycle 10.

Referring now to the right-hand side of the assembly shown in FIG. 2, second end 98 of skewer 93 includes a threaded portion 168 that cooperates with second head 110. Second head 110 includes a first portion or disk 170 and a second portion or disk 172. Similar to first head 108, first disk 170 of second head 110 includes an inboard face 174 that cooperates with a projection 176 that extends from fork 36 proximate dropout 106. First and second disks 170, 172 each include a threaded bore 178 that operatively cooperate with threaded portion 168 of skewer 93 so as to define a position of second head 110 relative to skewer 93. It is further appreciated that inboard faces 164, 174 of each of heads 108, 110 and projections 166, 176 could have virtually any shape provided they cooperate in such a manner as to selectively interfere with the removal of wheel assembly 38 from bicycle 10.

Although first and second disks 170, 172 could simply be counter-rotated to abut one another and thereby define the position of second head 110 relative to skewer 93, second disk 172 includes a second threaded bore 180 that receives a set screw 182. Set screw 182 of second disk 172 cooperates with first disk 170 so as to fix the position of first and second disks 170, 172 with respect to a longitudinal position of second head 110 relative to first head 108. As described further below, either construction allows quick release assembly 12 to be relatively easily configured for operation with different bicycle constructions.

Figure 3:
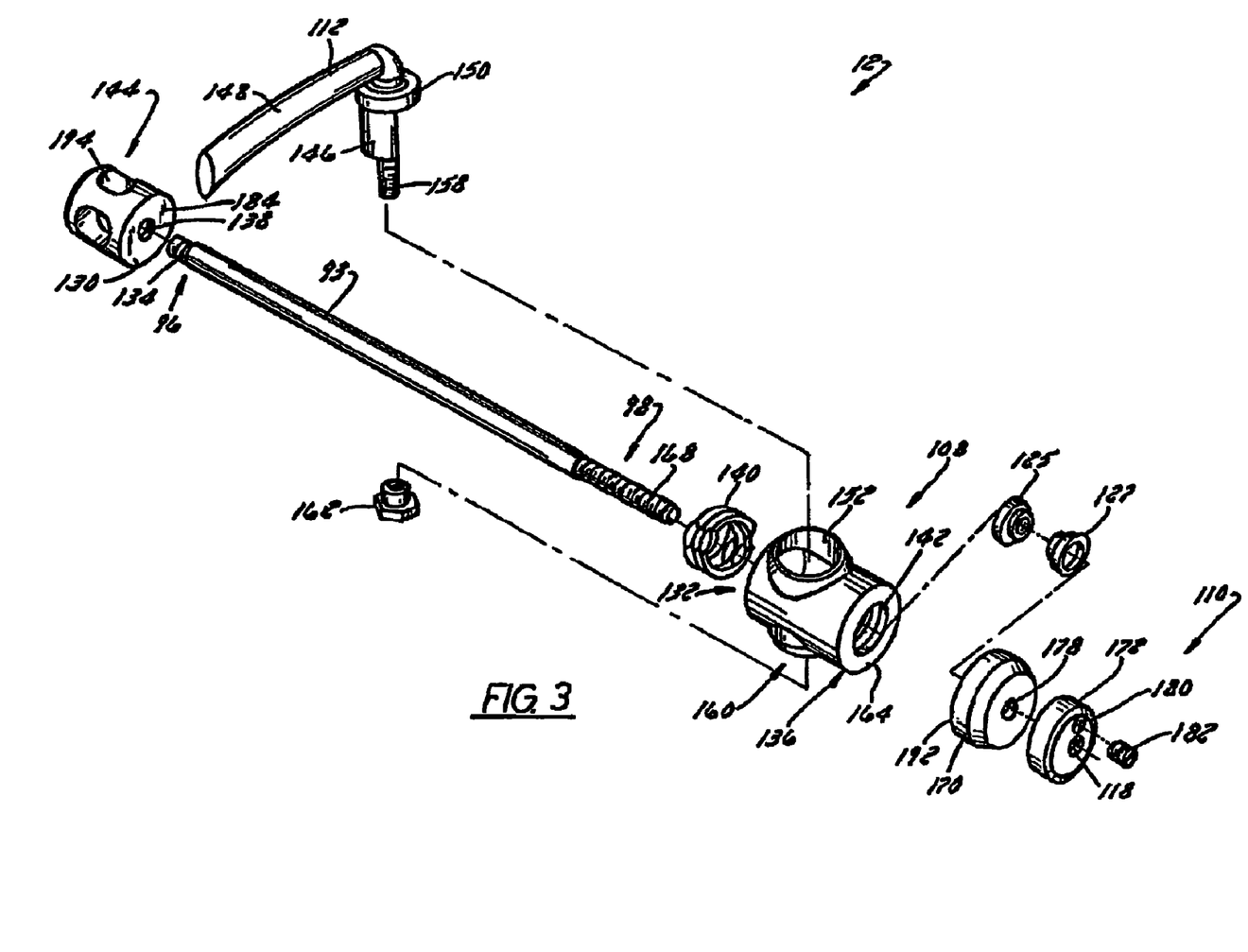
FIG. 3 is a perspective exploded view of the quick release assembly shown in FIG. 2.

FIG. 3 is an exploded view of quick release assembly 12. As shown in FIG. 3, threaded portion 134 of skewer 93 is constructed to cooperate with the threaded bore 138 formed on an inboard facing side or surface 184 of shuttle body 130. Spring 140 is displacable along the length of skewer 93 such that it can be positioned in abutting engagement with the inboard facing surface 184 of shuttle body 130. Such positioning disposes spring 140 proximate inboard facing side 142 of first head 108 and inboard facing surface 184 of shuttle body 130. It is appreciated that quick release assembly 12 could include other biasing means, such as a tension spring positioned on an opposite side of shuttle body 130, to bias shuttle body 130 in an outboard direction.

Once shuttle body 130 is positioned within cavity 132 of first head 108, threaded portion 158 and stem portion 146 of lever 112 can be passed through seat opening 152 of first head 108, passage 144 of shuttle body 130, and opening 160 formed in first head 108. Threaded portion 148 of lever 112 extends beyond opening 160 of first head 108 for engagement with fastener 162. The interaction of lever 112 with first head 108 and shuttle body 130 secures first head 108 proximate first end 96 of skewer 93. First disk 170 and second disk 172 cooperate with threaded portion 168 of skewer 93 and define a distance between inboard facing surface 190 of first head 108 and inboard facing surface 192 of second head 110. Manipulating set screw 182 allows first disk 170 and second disk 172 to be translated relative to threaded portion 168 of skewer 93. When a desired distance between first and second heads 108, 110 is attained, set screw 182 is tightened and generates a wedging force between the threads of threaded bore 178 of first and second disks 170, 172 and threaded portion 168 of skewer 93 thereby fixing the position of second head 110 relative to inboard facing side or surface 184 of shuttle body 130.

Figure 4:
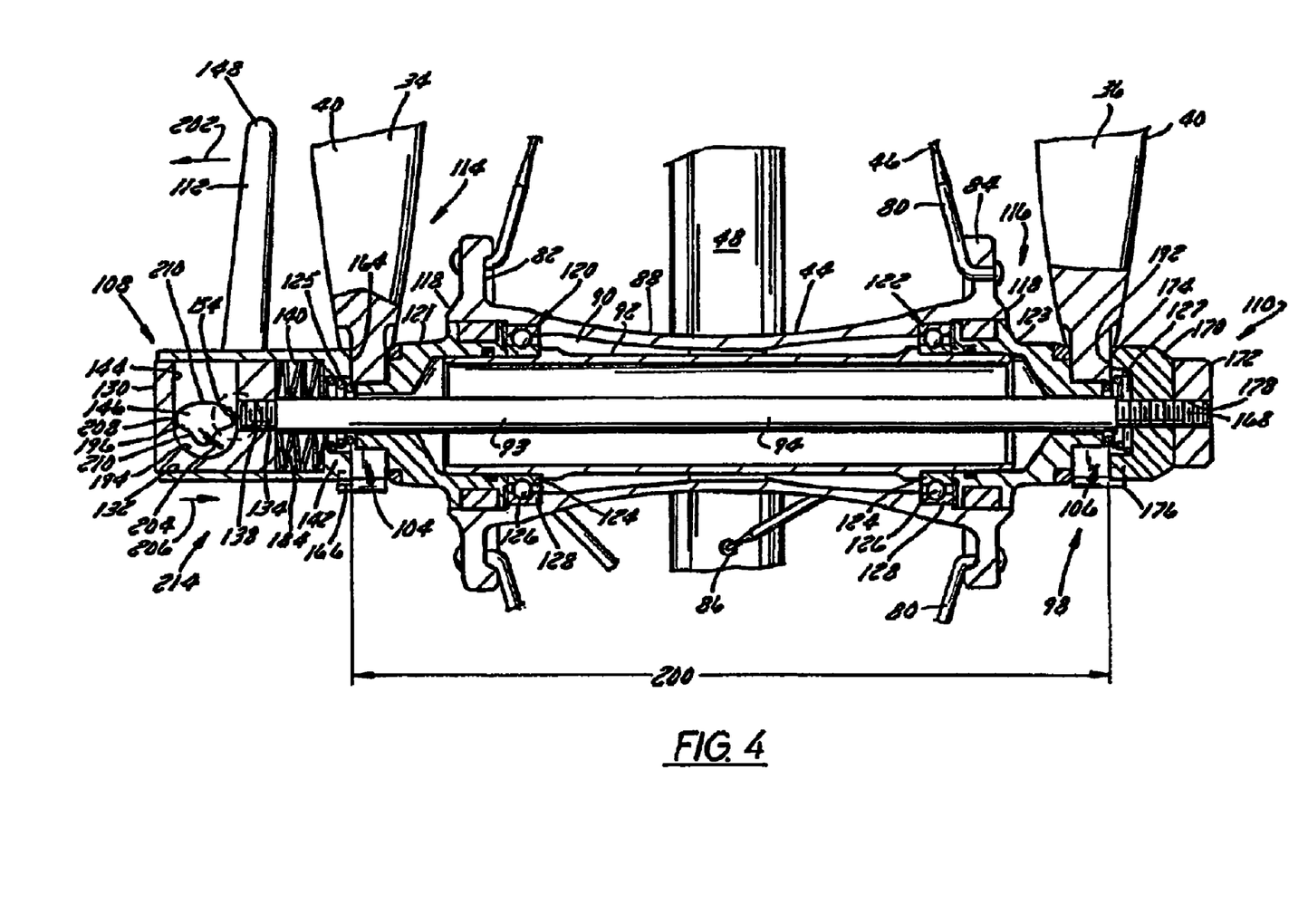
FIG. 4 a partial cross-sectional view of the quick release assembly shown in FIG. 3 taken along line 4-4 in FIG. 2 with the lever positioned to provide a closed and locked interaction between the quick release and the bicycle.

FIG. 4 shows a cross-sectional view of quick release assembly 12 along line 4-4 shown in FIG. 2. As show therein, passage 144 through shuttle body 130 provides a cam surface 194 that interacts with a cam 196 formed by the cross-sectional shape of stem portion 146 of lever 112. With second head 110 affixed to skewer 93, the outboard orientation of stem portion 146 relative to axis 154 maintains first head 108 and second head 110 at their nearest positions as indicated by distance 200. Distance 200 is associated with an orientation of first and second heads 108, 110 wherein the heads 108, 110 engage nearby structure of the bicycle and maintain a wheel assembly in a locked and secured engagement with bicycle 10. This association is also referred to as a closed and locked position indicative of the position of lever 112 and the relative positions of heads 108, 110 and their interaction with bicycle 10. Rotation of handle 148 of lever 112 in direction 202 translates cam 196 in direction 204 about axis 154. This translation translates shuttle body 130 in direction 206 against the bias of spring 140.

Figure 5:
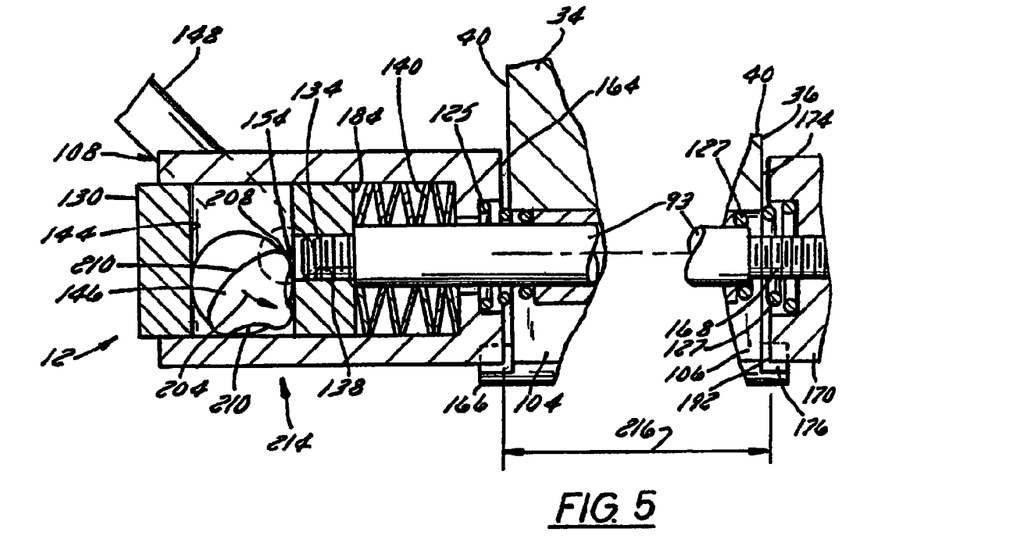
FIG. 5 is a view similar to FIG. 4 with the lever positioned to provide a closed and retained interaction.
Figure 6:
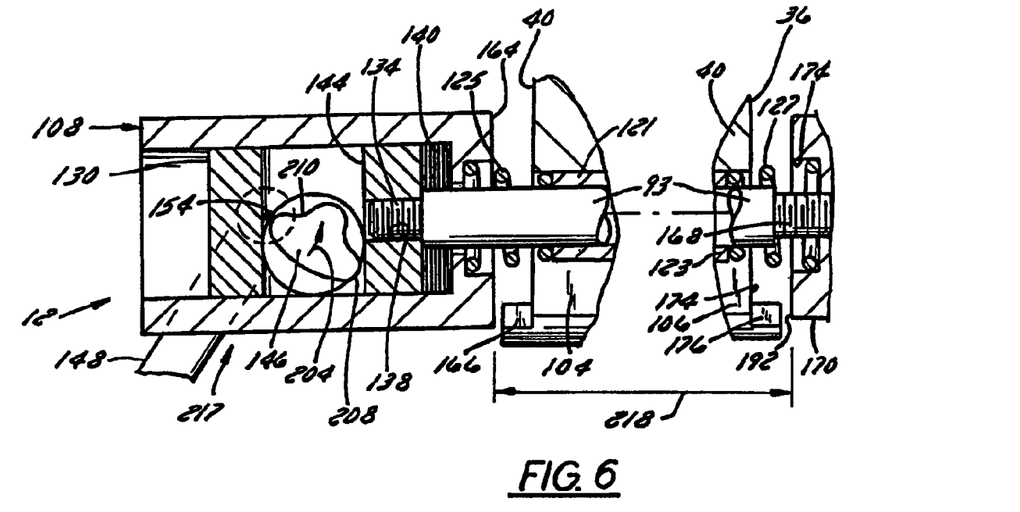
FIG. 6 is a view similar to FIGS. 4 and 5 with the lever positioned to provide an open and not retained configuration of the quick release assembly.

The distance between the inboard facing sides of first and second heads 108, 110 is increased by the translation of shuttle body 130 in an outboard direction relative to first head 108. Cam 196 includes a number of lobes 208 and a number of lands 210 located between adjacent lobes 208. Preferably, cam 196 is tri-lobed and shaped to cooperate with cam surface 194 so as to provide a tactile indication of the position of cam 196 relative to cam surface 194. As shown in FIGS. 4-6, translation of handle 148 in direction 202 from a first, closed and locked position 212, shown in FIG. 4, to a second, closed and retained position 214, shown in FIG. 5, translates cam 196 such that a land 210 cooperates with cam surface 194. The translation of the interface from a lobe 208 to a land 210 provides a tactile indication as to the relative position of first and second heads 108, 110. Referring to FIG. 5, when handle 148 is located in second position 214, the engagement of land 210 with cam surface 194 provides a second distance 216 between first head 108 and second head 110. Second distance 216 is indicative of an unlocked but closed and retained association of quick release assembly 12 and adjacent bicycle structure. That is, although wheel assembly 38 may be loose, inboard faces 164, 174 of heads 108, 110 still interfere with structure of dropouts 104, 106 so as to prevent the free translation of the wheel assembly relative to bicycle 10. Such a construction provides a secondary or redundant means of securing wheel assembly 38 to bicycle 10.

When it is desired to remove wheel assembly 38 from bicycle 10, handle 148 is rotated further in direction 202 and to such an extent that a substantial portion of cam 196 of stem portion 146 is positioned inboard of axis of rotation 154. Such displacement provides a third, or open and unrestrained position 217 associated with a third distance 218 between inboard facing surface 190 of first head 108 and inboard facing surface 192 of second head 110. Third distance 218 is greater than both distances 200 and 216. Preferably, distance 218 is selected to allow faces 164, 174 of heads 108, 110 to be freely translatable relative to dropouts 104, 106. Accordingly, quick release assembly 12 allows single-handed operation of the quick release assembly 12 to effectuate both the loosening of a wheel assembly and the removal of the wheel assembly from bicycle 10. That is, when handle 148 is rotated to provide third distance 218 between first head 108 and second head 110, quick release assembly 12 allows wheel assembly 38 in uninterruptible fashion relative to bicycle 10 through user interaction with only handle 148.

The multi-lobed construction of cam 196, the cooperation of cam 196 with cam surface 194 of shuttle body 130, and the positioning of spring 140, ensures that quick release assembly 12 is biased toward the closed and locked position 212 shown in FIG. 4. Cam 196 and cam surface 194 are further configured such that user interaction with handle 148 is required to overcome the bias of spring 140 to a degree sufficient to allow the uninterrupted translation of heads 108, 110 relative to the bicycle. Such a construction prevents the inadvertent orientation of quick release assembly 12 in a position wherein the quick release assembly may disengage from bicycle 10.

Figure 7:
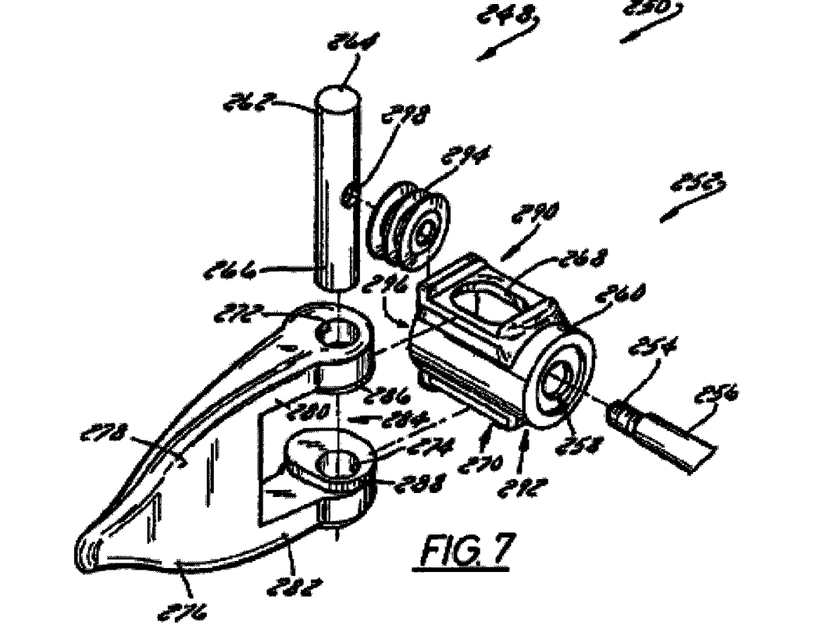
FIG. 7 shows an exploded view of an adjustable head portion of a quick release assembly according to the present invention.

FIGS. 7-10 show an operating side 248 of a quick release assembly 250 according to another embodiment of the present invention. It should be readily appreciated that assembly 250 provides an external cam assembly as compared to the generally internal cam and follower or cam surface association associated with release assembly 12. As shown in FIG. 7, quick release assembly 250 includes a head 252 that cooperates with an end 254 of a skewer 256. A head generally similar to or the same as second head 110 of assembly 12 cooperates with the opposite end of skewer 256 such that variable lengths can be provided between the respective heads of the assembly. End 254 of skewer 256 passes through an opening 258 formed in a body 260 of head 252 and engages a shuttle body 262 that is movable relative to body 260. Generally opposite ends 264, 266 of shuttle body 262 pass through generally elongated openings 268, 270 formed through opposite, top and bottom, sides of body to 60. As shown in FIG. 7, shuttle body 262 has a generally elongated cylindrical shape such that shuttle body 262 is provided as what is commonly considered a rod or shaft. Elongated channels or openings 268, 270 facilitate translation of shuttle body 262 relative to body 260 of assembly 250. As described further below, the translation of shuttle body 262 alters the distance between the inboard sides of the heads positioned at the generally opposite ends of skewer 256.

Shuttle body 262 is longer than the distance between elongated openings 268, 270 such that ends 264, 266 of the shuttle body 262 extend beyond elongated channels or openings 268, 270 and engaged respective openings 272, 274 formed in a lever 276. Lever 276 includes a handle portion 278 and a pair of arms 280, 282 that extend from handle portion 278. An opening or channel 284 is formed between arms 280, 282 and allows lever 276 to engage body 260 such that arms 280, 282 generally flank openings 268, 270 of body 260.

Figure 8:
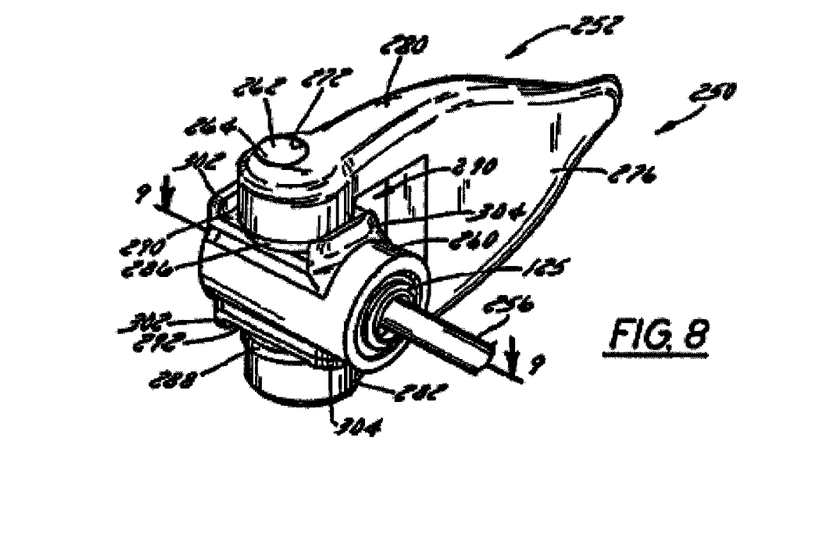
FIG. 8 is a perspective assembled view of the portion of the quick release assembly shown in FIG. 7.
Figure 10:
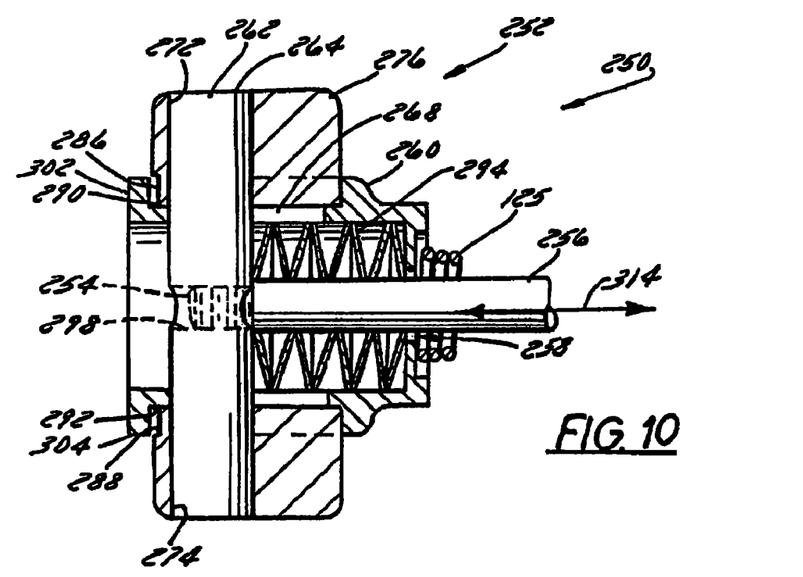
FIG. 10 is a cross-sectional view of the assembly shown in FIG. 7 and taken along a plane generally perpendicular to the view shown in FIG. 9.

As shown in FIGS. 7 and 8, each arm 280, 282 includes a cam profile or cam 286, 288 that cooperates with a respective cam surface 290, 292 positioned about each elongated opening 268, 270, respectively. During assembly, a spring 294 is disposed in a recess or chamber 296 of body 260. As shown in FIG. 10, spring 294 is captured in chamber 296 between shuttle body 262, the body 260 of head 252, and skewer 256. Spring 294 biases shuttle body 262 in an outward lateral direction relative to the wheel assembly and toward a lateral outward end of elongate openings 268,270. Said in another way, spring 294 biases skewer 256 in a direction away from the lateral inboard end of head 252 as spring 294 is captured between shuttle body 262 and the lateral inboard end of head 252. Openings 272, 274 of lever 276 are generally aligned with elongated openings 268, 270 of body 260 such that shuttle body 262 can be translated along its axis through the aligned openings 268, 270, 272, 274. When shuttle body 262 is oriented relative to lever 276 and body 260, end 254 of skewer 256 is engaged with an opening or threaded bore 298 formed in shuttle body 262 thereby securing head 252 to quick release assembly 250. Understandably, other means of securing skewer 256 to shuttle body 262, such as a fastener or other locking means, are envisioned and within the scope of the claims. Alternatively, elongated openings 268, 270 could be provided with an open end such that skewer 256 and shuttle body 262 could be provided as one body.

Figure 9:
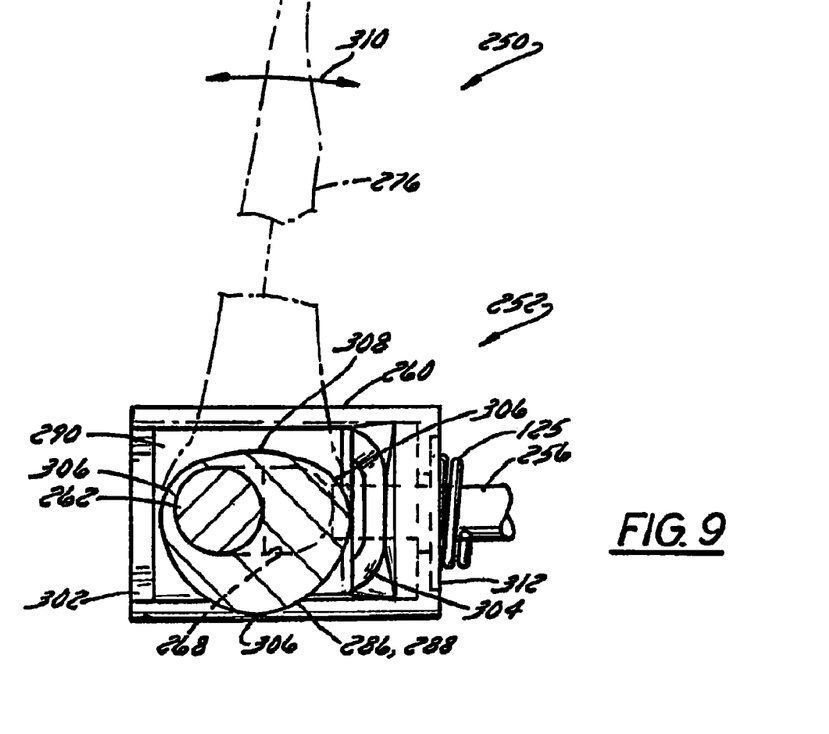
FIG. 9 is a cross-sectional view taken along line 9-9 shown in FIG. 8.

As shown in FIG. 8, cam 286 formed on upper arm 280 of lever 276 cooperates with cam surface 290 formed on body 260 and cam 288 formed on lower arm 282 of lever 276 cooperates with cam surface 292 of body 260. The association of cams 286, 288 and cam surfaces 290, 292 translates shuttle body 262 upon rotation of lever 276. Each cam surface 290, 292 includes a pair of lips 302, 304 that generally flank a respective cam 286, 288. As best shown in FIG. 8, lips 302, 304 of each cam surface 290, 292 are positioned on generally opposite sides of the respective cam 286, 288 such that a contact engagement is maintained between each cam 286, 288 and lips 302, 304 of each respective cam surface 290, 292 independent of the orientation of the handle relative to body 260. As shown in FIG. 9, each cam 286, 288 includes a number of lobes 306 and a number of lands 308 disposed between adjacent lobes 306. Lobes 306 and lands 308 cooperate with lips 302, 304 such that rotation of lever 276, indicated by arrow 310, translates shuttle body 262 relative to body 260 of head 252. As shown in FIGS. 7 and 8, channel 284 formed in lever 276 has a depth that allows lever 276 to rotate past a lateral outboard end of head 252 so as to allow shuttle body 262 to translate relative to elongate openings 268, 270 of body 260.

Similar to quick release assembly 12, translation of shuttle body 262 relative to head 252 alters the length of skewer 256 that extends between an inboard face 312 of head 252 and an inboard face of a head positioned at an opposite end of skewer 256. Understandably, when engaged with a bicycle, quick release assembly 250 cooperates with forks and redundant retention systems in a manner similar to that described with respect to assembly 12. Referring to FIG. 10, the cooperation of cams 286, 288 with cam surfaces 290, 292, respectively, translates shuttle body 262 along the elongated openings 268, 270 formed in body 260 during rotation of lever 276. As clearly shown by FIGS. 7, 8, and 10, cam 286 and cam surface 290 and cam 288 and cam surface 292 are oriented so as to be generally mirror images of one another. Shuttle body 262 and skewer 256 translate along an axis of skewer 256, indicated by arrow 314, thereby altering the distance between the inboard face 312 of head 252 and an inboard face of an opposite head. Similar to quick release assembly 12, quick release assembly 250 includes an optional spring 125 that is positioned about skewer 256 at a location inboard of head 252 and thereby necessarily at position that is also laterally inboard of spring 294. Preferably, as shown in FIG. 10, spring 125 is maintained in an abutting relationship with the inboard facing end of head 252. Like quick release assembly 12, quick release assembly 250 is operable to provide a closed and locked, a closed and retained, and an open and not retained interaction of the quick release assembly 250 with a bicycle. Further and also similar to quick release assembly 12, quick release assembly 250 also facilitates single-handed interaction and manipulation of a wheel assembly.

Quick release assembly 12 and quick release assembly 250 each provide a quick release assembly that is both efficient and simple to operate as well as simple to assemble and install. Each assembly also provides a quick release system that cooperates with the structure of a bicycle in a manner that cooperates with the redundant securing systems associated with the structure of the bicycle. It is further appreciated that quick release assemblies 12, 250 are exemplary of two possible cam and cam surface or follower orientations. Other cam and cam surface shapes are envisioned and within the scope of the claims.

The present invention has been described in terms of the preferred embodiment, and it is recognized that equivalents, alternatives, and modifications, aside from those expressly stated, are possible and within the scope of the appending claims. It is further appreciated that the respective features of any one of the embodiments discussed above is not necessarily solely exclusive thereto.

What is claimed is:

1. A bicycle wheel retention system comprising:
   a rod constructed to pass through a hub of a bicycle wheel;
   a first head attached to a first end of the rod;
   a second head attached to a second end of the rod;
   a recess formed in the first head;
   a shuttle body configured to cooperate with the recess;
   a handle engaged with generally opposite ends of the shuttle body and including a pair of arms that generally flank the first head; and
   a cam formed on one of the pair of arms and constructed to cooperate with a cam surface, the cam surface being formed on the first head and including a pair of lips shaped to flank the cam formed on the one of the pair of arms, such that rotation of the handle translates the shuttle body relative to the recess and maintain a contact engagement between the cam of the arm and the cam surface of the first head independent of an orientation of the handle relative to the first head.

2. The retention system of claim 1 further comprising elongated openings formed in the first head and fluidly connected to the recess for allowing the shuttle body to pass beyond the first head.

3. The retention system of claim 1 wherein the shuttle body is a shaft that extends from the first head in a crossing-direction relative to a direction of translation of the shuttle body.

4. The retention system of claim 1 wherein the cam is egg-shaped and is disposed between a pair of adjacent lips that extend from the first head.

5. The retention system of claim 4 wherein the lips are positioned proximate an elongated opening formed in generally opposite sides of the first head.

6. A bicycle wheel quick release assembly comprising:
   a skewer that passes through a hub of a bicycle wheel;
   a first head and a second head attached to opposite ends of the skewer;
   a recess formed in one of the first head and the second head and a pair of elongate openings formed in the one of the first head and the second head to flank the recess;

a shaft passing through the recess and the pair of elongate openings;

a first lip and a second lip that are formed integrally with and extending from the one of the first head and the second head proximate at least one of the pair of elongate openings such that each of the first lip and the second lip are offset from one another and positionally fixed with respect to the one of the first head and the second head;

a handle having a pair of arms engaged with generally opposite ends of the shaft; and a cam formed on one of the pair of arms and constructed to cooperate with each of the first lip and the second lip to maintain a contacting engagement between the cam and each lip independent an orientation of the handle relative to the one of the first head and the second head and so that rotation of the handle changes a position of the shaft relative to the one of the first head and the second head in a direction aligned with an axis of the skewer.

7. The bicycle wheel quick release assembly of claim 6 wherein the shaft further comprising a bore that threadingly engages the skewer.

8. The bicycle wheel quick release assembly of claim 7 further comprising another cam formed on the other of the pair of arms and constructed to cooperate with a third lip and a fourth lip that extend from the one of the first head and the second head proximate the other of the pair of elongate openings.

9. The bicycle wheel quick release assembly of claim 6 wherein the cam includes a plurality of lobes and a plurality of lands.

10. The bicycle wheel quick release assembly of claim 9 wherein the plurality of lobes and lands are oriented around the cam to define a closed and locked orientation, a closed and retained, and an open and not retained spacing between the first head and the second head relative to a bicycle frame structure.

11. The bicycle wheel quick release assembly of claim 6 further comprising a first spring captured between the shaft, the one of the first head and the second head, and the skewer, and that biases the shaft toward a lateral outward end of the pair of elongate openings.

12. The bicycle wheel quick release assembly of claim 11 further comprising a second spring disposed about the skewer and positioned on a lateral inboard side of the one of the first head and the second head relative to the first spring.

13. A bicycle wheel quick release assembly comprising:
a skewer that passes through a bicycle wheel;
a first head engaged with a first end of the skewer and a second head engaged with a second end of the skewer;
an elongated channel formed in the first head;
a shaft attached to the first end of the skewer and passing through the elongated channel formed in the first head;
a cam rotatably connected to the shaft;
a cam surface formed on an outer surface of the first head adjacent the elongated channel that engages the cam to alter a position of the shaft relative to the first head depending on a position of the cam relative to the cam surface; and
a first spring disposed in a recess formed in the first head, the first spring biasing the shaft in a direction away from an inboard end of the first head.

14. The bicycle wheel quick release assembly of claim 13 further comprising a handle connected to the cam.

15. The bicycle wheel quick release assembly of claim 14 wherein the handle includes a first arm that forms the cam and a second arm that forms another cam, the first arm and the second arm oriented to flank the first head.

16. The bicycle wheel quick release assembly of claim 15 further comprising another cam surface that cooperates with the another cam as a mirror image of the cam and the cam surface.

17. The bicycle wheel quick release assembly of claim 16 wherein the first arm and second arm are spaced apart so that the handle can rotate past a lateral outboard end of the first head.

18. The bicycle wheel quick release assembly of claim 13 further comprising another spring positioned about the skewer and abutting a laterally inboard end of the first head.

19. A bicycle wheel quick release assembly comprising:
a skewer that passes through a hub of a bicycle wheel;
a first head and a second head attached to opposite ends of the skewer;
a recess formed in one of the first head and the second head and a pair of elongate openings formed in the one of the first head and the second head to flank the recess;
a shaft passing through the recess and the pair of elongate openings;
a first lip and a second lip that are formed integrally with and extending from the one of the first head and the second head proximate at least one of the pair of elongate openings such that each of the first lip and the second lip are offset from one another and positionally fixed with respect to the one of the first head and the second head;
a handle having a pair of arms engaged with generally opposite ends of the shaft; and
a cam formed on one of the pair of arms and constructed to cooperate with each of the first lip and the second lip to maintain a contacting engagement between the cam and each lip independent an orientation of the handle relative to the one of the first head and the second head and so that rotation of the handle changes a position of the shaft relative to the one of the first head and the second head in a direction aligned with an axis of the skewer;
another cam formed on the other of the pair of arms and constructed to cooperate with a third lip and a fourth lip that extend from the one of the first head and the second head proximate the other of the pair of elongate openings.

* * * * *